United States Patent
Youssef et al.

(10) Patent No.: US 9,654,930 B2
(45) Date of Patent: May 16, 2017

(54) GEO-REFERENCE BASED POSITIONING OF A MOBILE DEVICE

(71) Applicant: RX Networks Inc., Vancouver (CA)

(72) Inventors: Mohamed Youssef, Marion, IA (US); Guylain Roy-Machabee, Vancouver (CA); Ashkan Izadpanah, Vancouver (CA)

(73) Assignee: Rx Networks Inc., Vancouver (CA)

( * ) Notice: Subject to any disclaimer, the term of this patent is extended or adjusted under 35 U.S.C. 154(b) by 0 days.

(21) Appl. No.: 15/197,614

(22) Filed: Jun. 29, 2016

(65) Prior Publication Data

US 2017/0006423 A1    Jan. 5, 2017

Related U.S. Application Data

(63) Continuation of application No. 14/345,387, filed as application No. PCT/CA2012/050659 on Sep. 20, 2012, now Pat. No. 9,414,196.

(Continued)

(51) Int. Cl.
*H04W 88/08* (2009.01)
*H04W 4/02* (2009.01)
(Continued)

(52) U.S. Cl.
CPC ......... *H04W 4/023* (2013.01); *H04W 64/003* (2013.01); *H04W 4/008* (2013.01);
(Continued)

(58) Field of Classification Search
CPC ............................... H04W 64/00; H04W 4/02
See application file for complete search history.

(56) References Cited

U.S. PATENT DOCUMENTS

| | | | |
|---|---|---|---|
| 7,346,359 B2* | 3/2008 | Damarla | G01S 5/0252 455/404.2 |
| 7,397,424 B2 | 7/2008 | Houri | |

(Continued)

FOREIGN PATENT DOCUMENTS

| | | |
|---|---|---|
| EP | 2139261 A1 | 12/2009 |
| JP | 2000106688 A | 4/2000 |

(Continued)

OTHER PUBLICATIONS

Office Action dated Oct. 3, 2016 issued on the corresponding Japanese application No. JP20140531057. English translation available.

(Continued)

*Primary Examiner* — Nay A Maung
*Assistant Examiner* — Frank Donado
(74) *Attorney, Agent, or Firm* — Geoffrey deKleine; Borden Ladner Gervais LLP

(57) ABSTRACT

A method of determining a location of a mobile device includes: detecting, at the mobile device, at least one Radio Frequency transmitter; receiving information associated with a number of Radio Frequency transmitters located within a geographical area, the number of Radio Frequency transmitters being a subset of all Radio Frequency transmitters located within the geographical area, the information being decodable to provide global locations and identifiers of the number of Radio Frequency transmitters; comparing an identifier associated with the at least one detected Radio Frequency transmitter with the global locations and identifiers of the number of Radio Frequency transmitters; and determining the location of the mobile device within the geographical area; wherein the information is received in a reduced format.

19 Claims, 11 Drawing Sheets

Related U.S. Application Data

(60) Provisional application No. 61/538,420, filed on Sep. 23, 2011.

(51) Int. Cl.
*H04W 64/00* (2009.01)
*H04W 84/12* (2009.01)
*H04W 4/00* (2009.01)
*H04W 88/02* (2009.01)

(52) U.S. Cl.
CPC ............ *H04W 84/12* (2013.01); *H04W 88/02* (2013.01); *H04W 88/08* (2013.01)

(56) References Cited

U.S. PATENT DOCUMENTS

| | | | |
|---|---|---|---|
| 8,369,264 | B2 | 2/2013 | Brachet et al. |
| 8,983,493 | B2 | 3/2015 | Brachet et al. |
| 2002/0098852 | A1* | 7/2002 | Goren ............... G01S 1/026 455/456.3 |
| 2003/0142523 | A1 | 7/2003 | Biacs |
| 2006/0019679 | A1* | 1/2006 | Rappaport ............ H04W 64/00 455/456.5 |
| 2008/0004037 | A1 | 1/2008 | Achlioptas et al. |
| 2008/0076430 | A1* | 3/2008 | Olson .................. H04W 36/32 455/440 |
| 2008/0176583 | A1 | 7/2008 | Brachet et al. |
| 2009/0011779 | A1 | 1/2009 | MacNaughtan et al. |
| 2009/0181688 | A1 | 7/2009 | Claussen et al. |
| 2010/0015996 | A1 | 1/2010 | Hirose |
| 2010/0298008 | A1 | 11/2010 | Burroughs |
| 2011/0057836 | A1 | 3/2011 | Ische et al. |
| 2011/0065451 | A1* | 3/2011 | Danado ............ H04M 1/72569 455/456.1 |
| 2011/0207475 | A1 | 8/2011 | Karr et al. |
| 2011/0227790 | A1 | 9/2011 | Li et al. |
| 2012/0040693 | A1* | 2/2012 | Wigren ................ G01S 5/0257 455/456.1 |
| 2012/0115512 | A1 | 5/2012 | Grainger et al. |
| 2014/0342755 | A1* | 11/2014 | Youssef ................. G01S 1/685 455/456.2 |
| 2015/0011249 | A1 | 1/2015 | Siliski et al. |

FOREIGN PATENT DOCUMENTS

| | | |
|---|---|---|
| JP | 2001168924 A | 6/2001 |
| JP | 2002533032 A | 10/2002 |
| JP | 2008020240 A | 1/2008 |
| JP | 2008537667 A | 9/2008 |
| JP | 2008306437 A | 12/2008 |
| JP | 2011509028 A | 3/2011 |
| WO | 03/098257 A1 | 11/2003 |
| WO | 2004/017092 A1 | 2/2004 |
| WO | 2005032202 A1 | 4/2005 |
| WO | 2009145211 A1 | 12/2009 |
| WO | 2010048101 A2 | 4/2010 |
| WO | 2010053863 A2 | 5/2010 |

OTHER PUBLICATIONS

Extended European Search Report and Written Opinion, dated Jan. 28, 2015, for corresponding EP Application No. 12833353.1-1811/2759178, 8 pages.
International Preliminary Report on Patentability for Application No. PCT/CA2012/050659, mailed on Mar. 25, 2014, 5 pages.
International Search Report for Application No. PCT/CA2012/050659, mailed on Oct. 15, 2012, 3 pages.
Written Opinion for Application No. PCT/CA2012/050659, mailed on Oct. 15, 2012, 4 pages.

* cited by examiner

GEO-REFERENCE BASED POSITIONING OF A MOBILE DEVICE

TECHNICAL FIELD

The present application relates to geo-reference based location of mobile devices using a wireless network.

BACKGROUND DISCUSSION

Modern mobile device positioning utilizes a combination of satellite-based and geo-reference based techniques. Existing geo-reference positioning methods generally look up the pre-recorded positions of one or more Radio Frequency (RF) transmitters, such as WiFi access points or cellular base stations, from a centralized database service or from a pre-loaded onboard database. The methods of the prior art generally require real time searching of databases that include a list of all possible Radio Frequency transmitters in a service area. Because of the size of these databases and because the databases may reside on a remote server, the access and search time for determining a position of the mobile device may be extensive. Further, the memory requirements for pre-loading onboard databases may add costs to the device positioning solution.

Some prior art solutions use a mobile device software client to record the presence of 802.11 signals, which are then associated with the current GPS location of the mobile device. The information is then logged into a centralized measurements database server. Information gathered from multiple devices is then analyzed and the estimated position of each 802.11 WiFi access point is calculated, stored in a centralized database and referred to when answering position requests from other clients based on one or more WiFi access points detected.

SUMMARY

In an aspect of the present disclosure there is provided a method of determining a location of a mobile device, including: detecting, at the mobile device, at least one Radio Frequency transmitter; comparing an identifier associated with the at least one detected Radio Frequency transmitter with identifiers of a number of Radio Frequency transmitters located within a geographical area, global locations associated with the identifiers having been decoded from information received at the mobile device prior to detection of the at least one Radio Frequency transmitter at the mobile device, the information comprising a global location of a single node of a geographically bounded tag of a region that covers the geographical area and an indexing procedure for determining global locations of other nodes of other geographically bounded tags of the region, the geographically bounded tags represented by a set of geometrically similar polygonal shapes of a grid structure, ones of the identifiers of the number of Radio Frequency transmitters associated with ones of the nodes; and determining the location of the mobile device by identifying a matching node between the identifier associated with the at least one detected Radio Frequency transmitter and one of the identifiers of the number of Radio Frequency transmitters associated with one of the nodes of the geographically bounded tags; wherein the identifiers of the number of Radio Frequency transmitters are reduced versions of corresponding Radio Frequency transmitter addresses and the location of the mobile device is determined based on a weighted average when the identifier associated with the at least one detected Radio Frequency transmitter is associated with more than one node.

In another aspect of the present disclosure there is provided a mobile device comprising: a wireless communication system for detecting at least one Radio Frequency transmitter; a processor in communication with the wireless communication system to: receive information associated with a number of Radio Frequency transmitters located within a geographical area, and decode the information prior to detection of the at least one Radio Frequency transmitter, the information comprising a global location of a single node of a geographically bounded tag of a region that covers the geographical area and an indexing procedure for determining global locations of other nodes of other geographically bounded tags of the region, the geographically bounded tags represented by a set of geometrically similar polygonal shapes of a grid structure, ones of the identifiers of the number of Radio Frequency transmitters associated with ones of the nodes; and following detection of the at least one Radio Frequency transmitter, compare an identifier associated with the at least one Radio Frequency transmitter with identifiers of the number of Radio Frequency transmitters to identify a matching node between the identifier associated with the at least one detected Radio Frequency transmitter and one of the identifiers of the number of Radio Frequency transmitters associated with one of the nodes of the geographically bounded tags; wherein the identifiers of the number of Radio Frequency transmitters are reduced versions of corresponding Radio Frequency transmitter addresses and the location of the mobile device is determined based on a weighted average when the identifier associated with the at least one detected Radio Frequency transmitter is associated with more than one node.

In another aspect of the present disclosure there is provided a method of generating and storing an encoded structure associated with a geographical area for use in determining a location of a mobile device, the method comprising: selecting a polygonal shape for cells of a grid structure, the cells comprising nodes, adjacent ones of the cells sharing common nodes; selecting a number of the cells; searching a reference database comprising identifiers of Radio Frequency transmitters of the geographical area and global locations of the Radio Frequency transmitters and linking identifiers of selected ones of the Radio Frequency transmitters to the nodes based on at least one of: proximity to the global locations of the nodes, recorded received signal strength at the global locations of the nodes, number of recorded observations at the global locations of the nodes, location uncertainty of the selected ones of the Radio Frequency transmitters and recorded signal propagation time at the global locations of the nodes; storing the selected ones of the Radio Frequency transmitters in association with ones of the nodes of the encoded structure and storing a global location in association with a first node of a first cell, global locations of other ones of the nodes of the grid structure determinable based on an indexing procedure of the encoded structure; wherein the identifiers are reduced versions of the Radio Frequency transmitter addresses of the selected ones of the Radio Frequency transmitters.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present application will now be described, by way of example only, with reference to the attached Figures, wherein:

FIG. 4A shows an example of GVS Region partitioning;
FIG. 4B shows a nested GVS Region partition.

DETAILED DESCRIPTION

Figure 1:
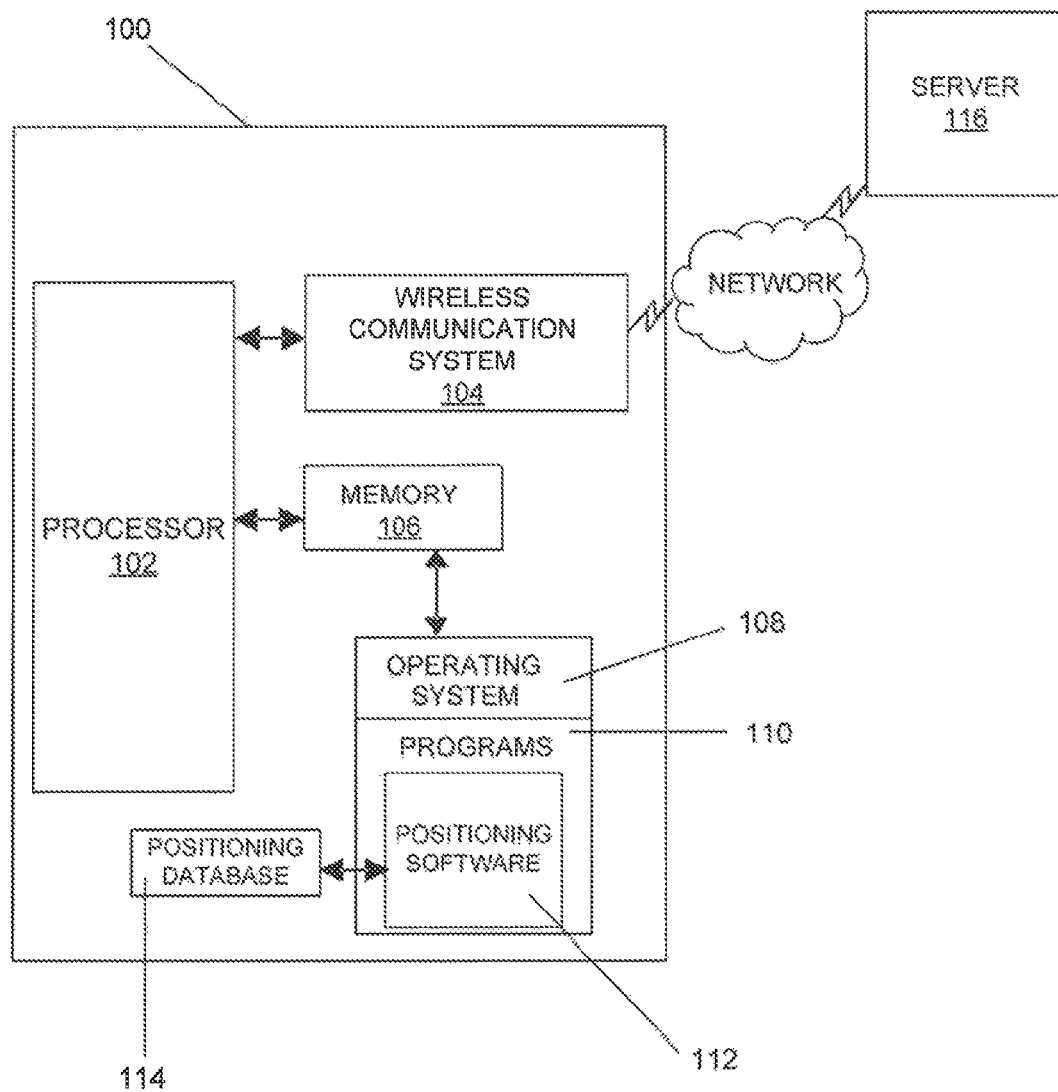
FIG. 1 is a block diagram of an example mobile device.

The present disclosure describes an example mobile device, methods and systems of generating, packaging and distributing regional subsets of geo-reference positioning information and using the positioning information to determine a location.

According to one example, the mobile device, methods and systems described herein efficiently manage and distribute a regional subset (GVS Region) of geo-reference tags (GVS Tags) based on an extensible Geocoded Vector Signature (GVS) method. GVS Regions include information associated with some of the Radio Frequency transmitters located within a geographical area. A client radio device, or mobile device, may efficiently utilize its resources to fix its position, self-update current GVS Region information and optionally receive updates or new GVS Regions from a centralized service with minimum network data payload and onboard computing overhead requirements. The term "Geocoded Vector Signature" (GVS) is used throughout the description to generally refer to information associated with one or more Radio Frequency (RF) transmitters, which may be cellular base stations, access points of a WiFi network, or other 802.XX radio or network equipment, in a geographical area, and should not be interpreted as limiting. In general, the information associated with the Radio Frequency transmitters is encoded using a vector approach and the vectors of information are associated with geographical areas.

The present disclosure further provides methods, systems and apparatus for efficiently generating, distributing and refining GVS Regions of GVS Tags. Different methods for generating GVS Regions based on target accuracy, data payload and computing power requirements may be provided. Each GVS Tag includes information about a number of nearby Radio Frequency transmitters selected based on their overlapping geometry within a given service area. Radio Frequency transmitters are uniquely identifiable by their respective ID (e.g. cellular base station number, Wi-Fi access points MAC address . . . ). The mobile device may determine its position by comparing the nearby Radio Frequency transmitter identifiers that the mobile device is able to detect against a preloaded GVS Region, which is a geographically bounded subset of GVS Tags defined by reference to a global coordinate system. In order to detect nearby Radio Frequency transmitters, a wireless communication subsystem includes a Radio Frequency receiver and the mobile device generally uses a "sniffing" method that is well known in the art and therefore will not be described further here. Other methods may be used for detecting nearby Radio Frequency transmitters, such as active listening or passive scanning, for example.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Referring now to FIG. 1, a method of determining a position of a mobile device may be performed by example mobile device 100. The mobile device 100 includes a number of components including those shown in FIG. 1. A processor 102 controls mobile device operation and communicates with a wireless communication system 104, which may communicate with a wireless network, and a memory 106. An operating system 108 and software programs 110, including positioning software 112, are stored in the memory 106 and executed by the processor 102. The presence of the positioning software 112 and a positioning database 114 allow the mobile device to operate as a GVS client.

The positioning software 112 receives, decodes and updates GVS Regions, which are then stored in the positioning database 114. The GVS Regions are generated at a server 116, which includes a GVS Factory. The GVS Factory, which is generally software that is operable on the server, accesses a global database of reference location and unique ID information of Radio Frequency Transmitters to generate, package, and distribute GVS Regions of GVS Tags to the mobile device 100. When the GVS Regions of GVS Tags have been received at the mobile device 100, the positioning software 112 further operates as a positioning engine to provide a position of the mobile device 100 based on detected nearby Radio Frequency Transmitters that are compared with the GVS Tags within the currently active GVS Region.

In one embodiment, generating, packaging and distributing of GVS Regions of GVS Tags is performed locally on the mobile device 100. In this embodiment, the GVS Factory operates on the mobile device 100 and accesses a global database of reference Radio Frequency Transmitter locations, or alternatively, is capable of assembling a local database from its own geo-tagged recordings of detected nearby Radio Frequency Transmitters.

Operation of the GVS Factory, which includes three primary phases having sub-phases, will now be described. A GVS Region is a geographically bounded subset of GVS Tags. The GVS Tags themselves are represented using a set of geometrically similar polygonal shapes such as squares or hexagons, for example. The consistent geometry allows the representation of GVS Tags to take advantage of adjacent and/or overlapping shape segments, shape nodes, with either fixed and/or variable shape sizes.

The GVS Regions are uniquely described by respective preambles followed by a list of GVS Tags. Each preamble includes a GVS Region ID field, reference position index, position index direction, resolution, total number of hops, and reference timestamp. The GVS Region ID is a unique number assigned by the GVS Factory. The reference position index is a reference to the global coordinate value of the first GVS Tag within the GVS Region, typically a latitude/longitude/altitude position. The Position index direction is used to determine the direction (e.g. horizontal or vertical) and the step status (e.g. increment or decrement) towards the center of the shape representing the next GVS Tag in the GVS Region, as shown at Table 1. The resolution is a value that reflects the size of the regular shapes generated by the GVS Factory. The total number of hops indicates the maximum GVS Tag count found within the GVS Region. The total number of hops is used for quality control purposes at the Positioning software 112 of the mobile device 100 to verify the integrity of the total number of retrieved GVS Tags included within a given GVS Region. The reference timestamp reflects the most recent update of the GVS Region, which can be used to determine whether the data that is present on the mobile device is up-to-date or no longer current. In general, the GVS Region is an encoded structure which, using a single actual shape position, allows for the description of an unlimited number of shapes relative to the first one. The encoded structure facilitates a very efficient update mechanism in which individual GVS Tags within a GVS Region can be updated without retransmitting the entire GVS Region. Table 1 provides an example of how the Position Index is used to "walk through" and refer to each GVS Tag present within a GVS Region.

TABLE 1

| Direction | | Indication |
| --- | --- | --- |
| 0 | 0 | Horizontal & Increment |
| 0 | 1 | Horizontal & Decrement |
| 1 | 0 | Vertical & Increment |
| 1 | 1 | Vertical & Decrement |

The GVS Factory generates a GVS Region for a targeted and bounded geographical area. The number of GVS Tags within a given GVS Region is a function of several factors, including the selected GVS Tag shape, the desired resolution and the availability and density of actual number of Radio Frequency Transmitters in the global reference Radio Frequency Transmitter database for the selected area. Parts of the GVS data may be pre-generated and assembled later to optimize download time.

In an embodiment, a central position of the polygon shape is the known reference position index associated with the GVS Tag within the GVS Region. In another embodiment, the GVS Factory generates a grid of GVS Tag nodes according to the selected polygon shape representing the GVS Tags within the GVS Region. Each GVS Tag node in the grid is a node of the polygon shape and the position of each GVS Tag node can therefore be exactly referenced within the geographical area covered by the GVS Region. In still another embodiment, the GVS Factory scans the global database of Radio Frequency Transmitters to find the Radio Frequency Transmitters that best match each of the GVS Tag nodes in the grid covered by the GVS Region.

Different methods may be used to select best nearby Radio Frequency transmitters to associate to each GVS Tag node. The described selection methods may be used individually or may be combined with other methods. The selection may be based on the technology used by each of the nearby Radio Frequency transmitters. The selection may be based on the Radio Frequency Transmitter in the global Radio Frequency Transmitter database closest to the absolute position of any given GVS Tag node. The selection may be based on the Radio Frequency Transmitter near the GVS Tag node with the highest recorded Received Signal Strength (RSS) in the global Radio Frequency Transmitter database. The selection may be based on the Radio Frequency Transmitter with the more recent observations. The selection may be based on the Radio Frequency Transmitter near the GVS Tag node with the highest number of observations recorded in the global Radio Frequency Transmitter database. In other words, the number of times that the Radio Frequency Transmitter has been previously observed at or near this given position, thereby increasing the odds that a Mobile device 100 at or near this position will also detect the same Radio Frequency Transmitter. Further, the selection may be based on the position uncertainty of the Radio Frequency Transmitter near the GVS Tag node in the global Radio Frequency Transmitter database. The selection may be based on the Geometry (i.e. the relative position) of the selected nearby Radio Frequency Transmitters with respect to adjacent nodes on the grid of the GVS Region, or the selection may be based on the signal propagation time such as the timing advance. The selection may also be based on partial human intervention where the transmitter has been specified as a known truth location.

When the GVS Factory has completed the GVS Region structure definition, including the underlying GVS Tag reference positions, and selected the set of Radio Frequency Transmitters that best match the nodes of all GVS Tags, construction of the GVS Tag may begin.

Without loss of generality, an example of the generation of the GVS Tag payload structure and the generation of the GVS Tags by the GVS Factory will be described with a) the GVS Region using a hexagon shape as its underlying grid structure and b) the Radio Frequency Transmitter technologies being Cellular and Wi-Fi and therefore being identifiable using Cell-ID and MAC addresses.

Figure 2:
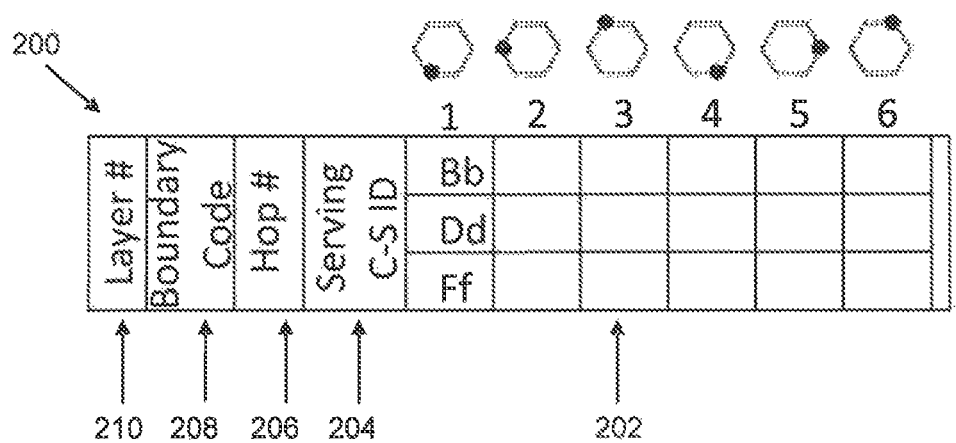
FIG. 2 shows a payload structure of a GVS Tag.

As shown at FIG. 2, the GVS Tag payload structure 200 includes the following information fields: a) unique identifiers 202 for each of nodes 1 to 6 of the hexagon-shaped GVS Tag; b) the serving Cell Sector-Identifiers (C-SID) 204; and c) a header which includes three flags: hop count 206, boundary code 208, and layer number 210. The unique identifiers, such as Bb:Dd:Ff for node 1, for example, are derived from the respective MAC addresses (typically in a Aa:Bb:Dd:Ee:Ff format) of the Radio Frequency transmitter(s) of the selected Wi-Fi access points (APs) found to best match locations of respective nodes of the GVS Tag. The unique identifiers are placed in the GVS Tag payload according to a geometrical order.

A unique identifier may be any identifier that uniquely refers to one or more Radio Frequency transmitters associated with a node. The unique identifiers may be globally unique or unique within a GVS region. A compressed form of a MAC address is one example of a unique identifier, however, other types of unique identifiers are possible. In general, unique identifiers are a reduced version of actual Radio Frequency transmitter(s).identifiers associated with a node.

The use of two or more Radio Frequency Transmitter technologies, each with different Radio Frequency propagation and coverage areas, adds a level of redundancy to the GVS Tags. There are three main benefits of using the serving C-SID field: a) reduce the probability of having duplicated Wi-Fi APs MAC addresses within the same serving C-SID, and hence, enable the use of a compressed version of MAC address to reduce payload size; b) accelerate the search algorithm within the mobile device 100 to find MAC address matches and return a rapid coarse position; and c) maintain autonomous positioning capability beyond limitations of any given single Radio Frequency Transmitter technology, such as those currently found in Wi-Fi based positioning technologies in certain areas (e.g. tunnels, rural or heavy foliage) and mobile scenarios (e.g. a client device riding a train/bus and accessing train's/bus's Wi-Fi AP).

The GVS Tag includes a hop count field (Hop #) which represents the number of hops with respect to the reference position index as defined in the GVS Region preamble. The GVS Tag further includes a field called Boundary Code, which allows the GVS Factory to very effectively index the position of each GVS Tags within a GVS Region. Table 2 lists different Boundary Codes.

TABLE 2

| Boundary Code | | | | | Description |
|---|---|---|---|---|---|
| 0 | 0 | 0 | 0 | Middle | Tier 1 |
| 0 | 0 | 0 | 1 | | Tier 2 |
| 0 | 0 | 1 | 0 | | Tier 3 |
| 0 | 0 | 1 | 1 | | Tier 4 |
| 0 | 1 | 0 | 0 | | Tier 5 |
| 0 | 1 | 0 | 1 | | Tier 6 |
| 0 | 1 | 1 | 0 | | Tier 7 |
| 0 | 1 | 1 | 1 | | Tier 8 |
| 1 | 0 | 0 | 0 | Edge | North |
| 1 | 0 | 0 | 1 | | East |
| 1 | 0 | 1 | 0 | | West |
| 1 | 0 | 1 | 1 | | South |
| 1 | 1 | 0 | 0 | Corner | North East |
| 1 | 1 | 0 | 1 | | South East |
| 1 | 1 | 1 | 0 | | North West |
| 1 | 1 | 1 | 1 | | South West |

Boundary Codes that start with "10" indicate that a GVS Tag is located at the boundary of the geographical area covered by the GVS Region. Boundary codes that start with "11" indicate that a GVS Tag is located at a corner of the geographical area covered by the GVS Region. The positioning software 112 of the mobile device 100 can use Boundary Codes to enable a specific position indexing procedure when a Boundary Code starting with "11" (i.e. a corner GVS Tag) is found, which allows the GVS Region to cover irregular geographical areas. For example, a GVS Region may be defined to circumvent a large body of water near an urban setting or a GVS Region may be defined according to standardized, but irregularly shaped areas such as municipal or regional counties.

Therefore, in one embodiment, the GVS Tag Position Indexing Procedure in the GVS Factory may sequentially walk through and describe each GVS Tag in the GVS Region by: 1) Going forward by incrementing the position index of the next GVS Tag by one step in the same current direction (i.e. horizontal or vertical); 2) Taking a turn by incrementing the position index of the next GVS Tag by one step while changing direction (i.e. from horizontal to vertical, or vice versa); and 3) Going backwards by decrementing the position index by one step in the same current direction (i.e. horizontal or vertical).

In another embodiment, the Position Indexing Procedure can follow a two-dimensional position index displacement table generated by the GVS Factory.

To reference a position in 3D, the GVS Factory uses a Layer Number field (Layer #) to indicate the height (altitude) and/or floor level. Hence, the GVS Factory can generate multiple GVS Tags at any given 2D position index with different layer numbers to facilitate 3D positioning.

Figure 3:
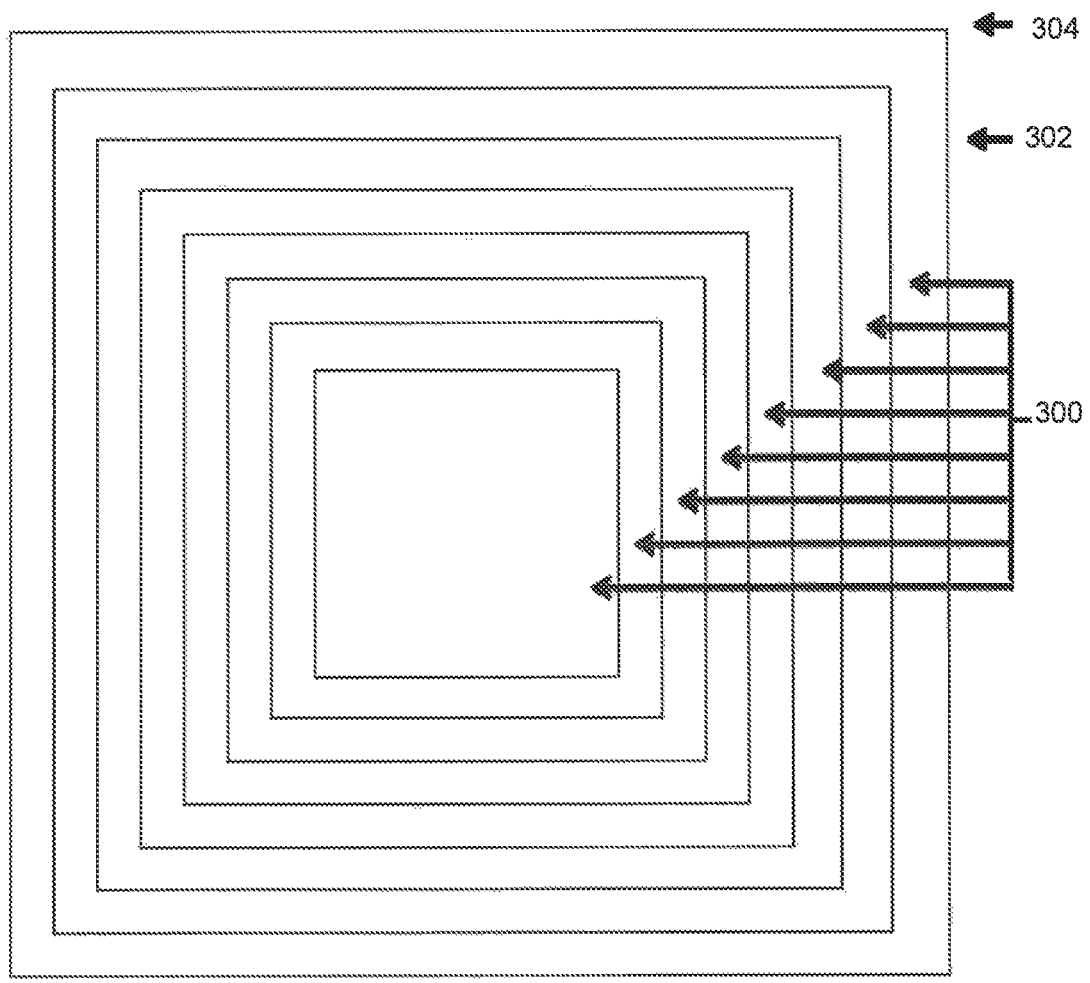
FIG. 3 shows tiers within a GVS Region.

Referring to FIG. 3, a GVS Region Tier 300 is a virtual shape (e.g. square, circle, sector, shell . . . etc.) centered in the middle of a GVS Region and covering a geographical area within the GVS Region. The GVS Region Tier number is a Boundary Codes starting with "0". The GVS Factory can associate GVS Tags within Tiers while building the GVS Tags' payload. Tiers can be used by the positioning software 112 of the mobile device 100 to optimally detect when an edge 302 or a corner 304 of the GVS Region is being approached and therefore dynamically request adjacent GVS Region(s) from a server if the mobile device 100 does not already have a suitable adjacent GVS Region.

The GVS Region is the basic unit for transferring information between the GVS Factory and a mobile device 100. While the Layer # located within GVS Tags makes it possible to locate a client device in three dimensions, the GVS Region, in one embodiment, partitions the positioning database, which contains WiFi AP positions, using only longitude and latitude reference coordinates.

A GVS Region is referenced by an identifier called Region ID. The Region ID facilitates 1) identification by the GVS Factory of a set of GVS Regions to be sent to the mobile device 100 and 2) search/request of adjacent GVS Regions by the mobile device 100. The GVS Region is generated by the GVS Factory according to the following: (a) the GVS Region ID is unique; (b) the GVS Region ID is fixed; (c) the GVS Region ID can easily identify adjacent GVS Regions and (d) the GVS Region ID is identified by reference to a global coordinate system.

Figures 4A, 4B:
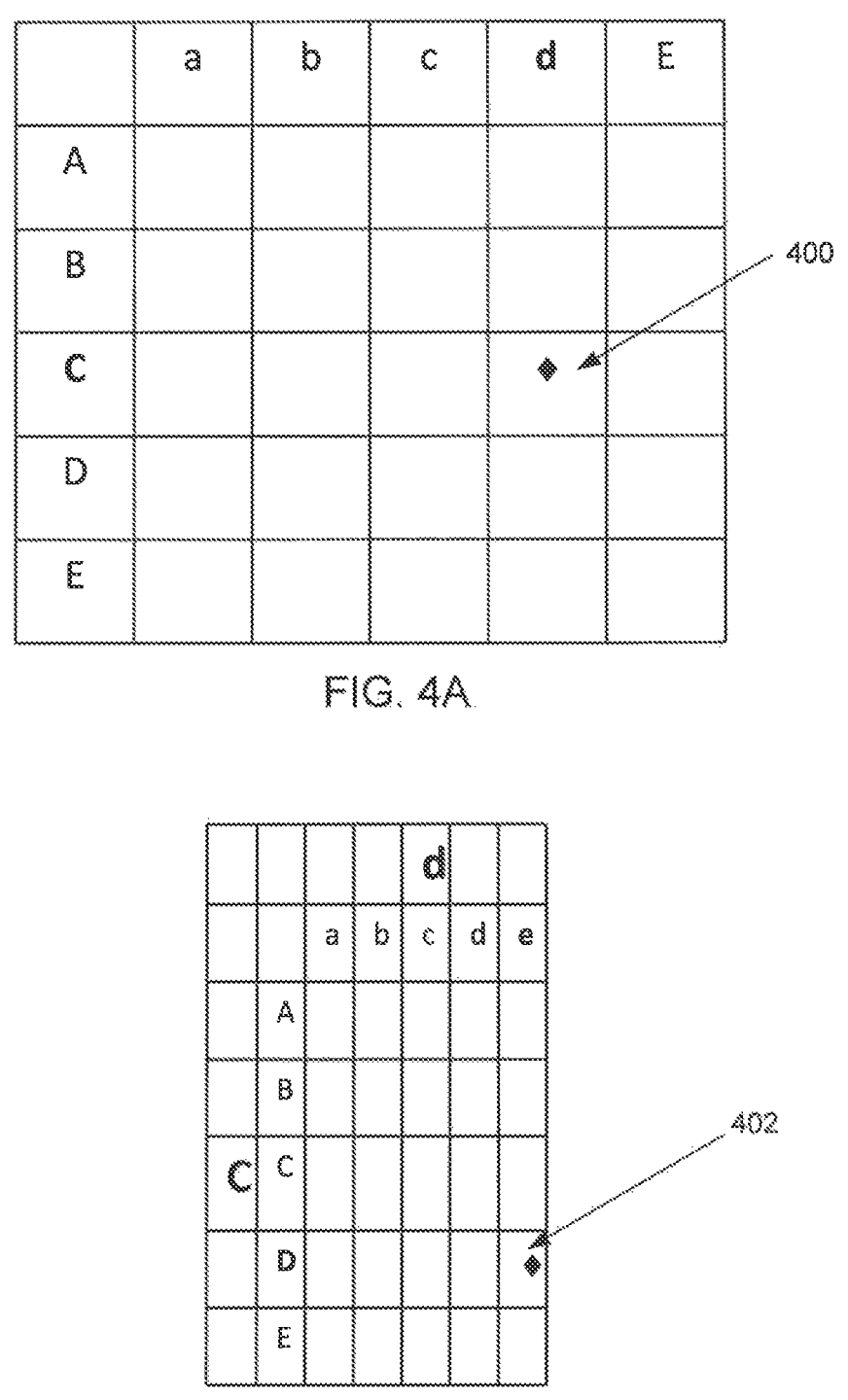

GVS Regions may themselves be partitioned based on a nested grid structure, which partitions a given geographic area into uniform boundaries as shown in FIG. 4A. For example, the GVS Region 400 in the grid cell shown as "♦" in FIG. 4A may be uniquely identified by its "Cd" Region ID, which is the intersection of the row and column of the grid structure. In a nested fashion, the "Cd" grid cell may be further partitioned into uniform boundaries as shown in FIG. 4B. Therefore, the GVS Region 402 in the grid cell shown as "♦" in FIG. 4B may be uniquely identified by a refined "CdDe" Region ID. This method is scalable for further geographical boundary refinement. The position located at the center of each GVS Region ID represents the central points in which the GVS Region Tiers are constructed.

Figure 5:
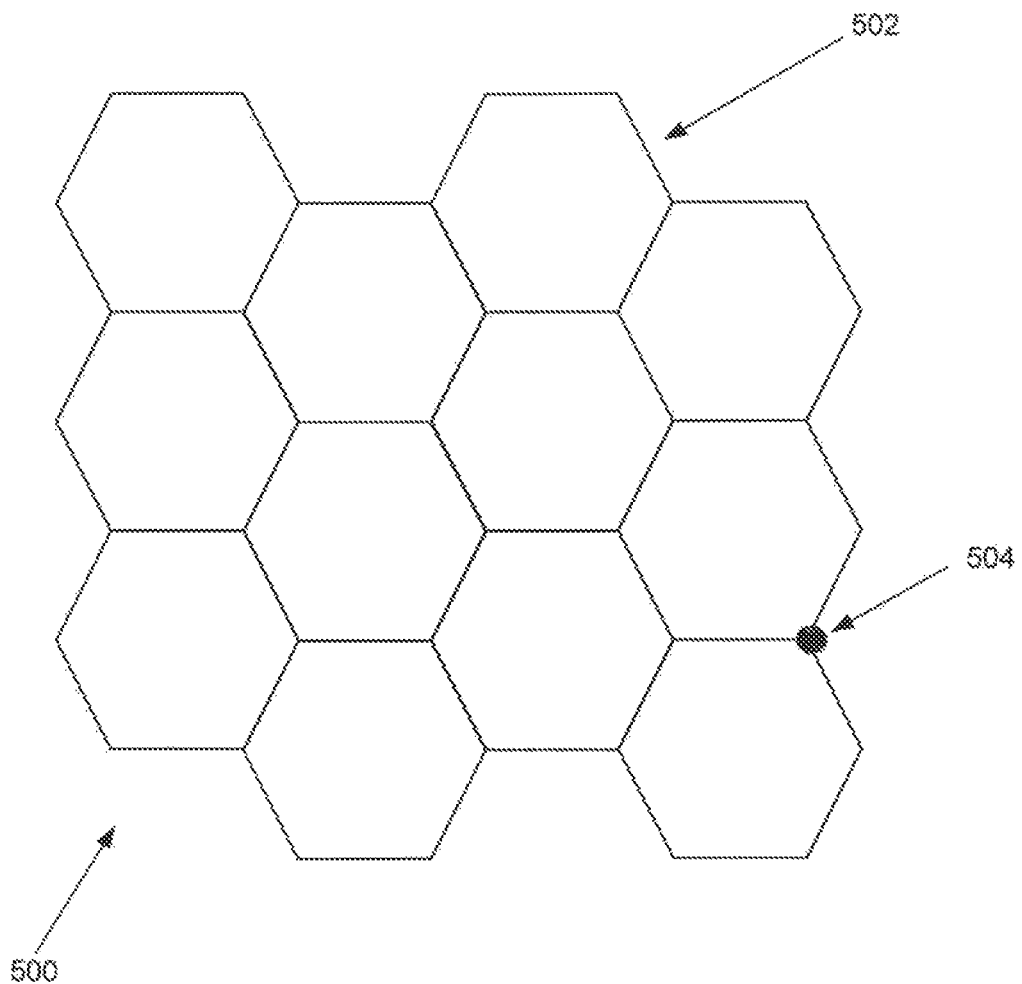
FIG. 5 shows a subset of a GVS Region.

Referring to FIG. 5, an example of a subset 500 of a GVS Region that uses a regular hexagon shape for its GVS Tags 502 is shown. As the GVS Factory finds best matching APs close to the nodes 504 of each GVS Tag, neighbouring GVS Tags will share some common APs. Hence, the GVS Factory exploits this redundancy between adjacent GVS Tags to avoid sending duplicated APs identifiers.

Figure 6A:
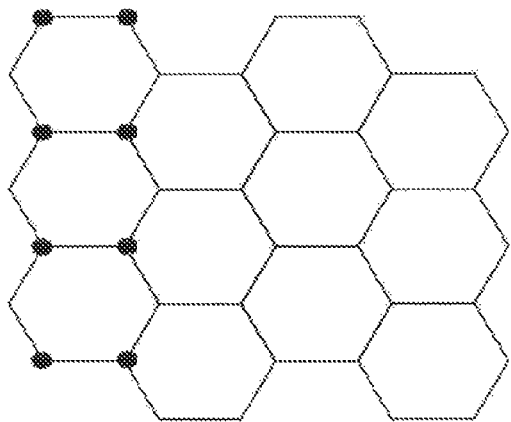
FIG. 6A, FIG. 6B, FIG. 6C and FIG. 6D depict how GVS Tags are generated.
Figure 6B:
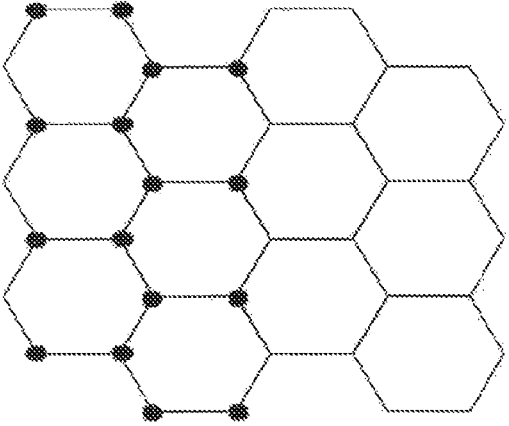
Figure 6C:
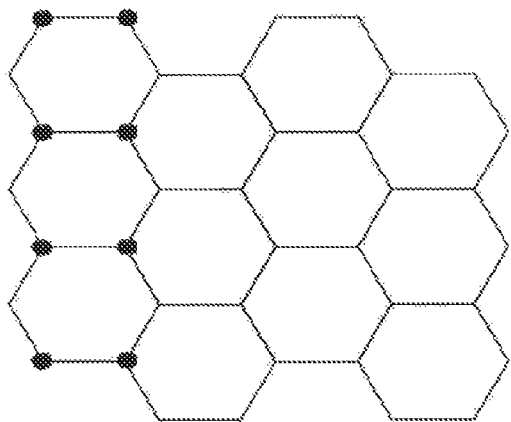
Figure 6D:
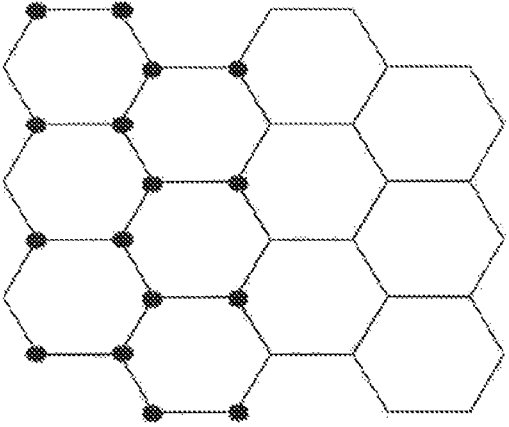

In the example described of FIG. 5, every trio of neighbouring GVS Tags shares a common AP. Hence, the GVS Factory only needs to send two APs per GVS Tag as shown at FIGS. 6A to 6D in order for the positioning software 112 of the mobile device 100 to fully reconstruct the GVS Region and Tags locally. The GVS Factory packages GVS node data, based on the grid shape selected for the GVS Region in order to generally eliminate any duplication of the data. FIG. 6A shows the first column of GVS Tags generated by only two APs; FIG. 6B shows the second column of GVS Tags casted by only two APs, while the first columns of GVS Tags reconstructed part of their missing APs information; FIG. 6C a third column of GVS Tags helps the second columns to reconstruct their missing APs information; FIG. 6D shows a complete subset of the GVS Region.

Determination of a location of the mobile device 100 will now be described. The positioning software 112: a) computes the mobile device location based on the current GVS Region(s) received from a GVS Factory, b) populates and updates the current GVS Region(s) in its local memory, c)

periodically reports updates back to the GVS Factory to continuously improve the performance of the system, and d) exchanges GVS Regions and acquired Radio Frequency transmitter information with peer devices, such as mobile phones, tablets and laptops, for example.

When a GVS Region has been retrieved from the GVS Factory, the GVS Region is provided in a reduced format that is based on the grid structure having polygonal-shaped cells. In order to locally decode and reconstruct all the GVS Tags within the GVS Region a) position index population and b) GVS Tag cross referencing are performed.

In one embodiment, the positioning software 112 of the mobile device 100 populates position indexes of the GVS Tags by using information from the GVS Region Preamble (e.g. reference position index and resolution) and GVS Tags (i.e. Hop # field and Boundary Code). In other words, starting with the reference position index, the positioning software 112 follows the direction, Hop # and Boundary Codes instructions to fully map the position index of each GVS Tag within the GVS Region.

In another embodiment, the GVS Factory sends information to the mobile device 100. The information includes specific coordinate offsets per GVS Tag with respect to the reference position index of the GVS Region. This allows for efficient compression of overlay updates.

Since the GVS Factory packages GVS Tags having a minimum number of APs to avoid duplication, the repopulated GVS Tags will include unique identifiers, which may include only part of the AP Identifier information. The cross-referencing process is performed in order to associate AP information with each of the GVS Tag nodes. In one embodiment, adjacent GVS Tags share information about common APs according to the relative geometry within each GVS Tag. In another embodiment, internal counters may be generated per GVS Region when a new row and/or column has been repopulated. In still another embodiment, the GVS Factory may send information to the mobile device 100 that contains updated AP ID association within GVS Tags.

Figure 7:
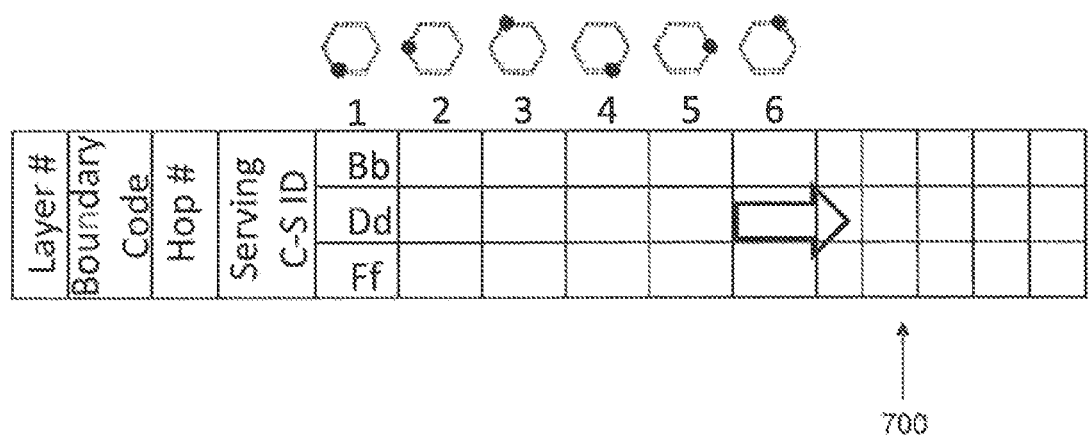
FIG. 7 shows a GVS Tag excess update.

Referring to FIG. 7, an augmented GVS Tag payload structure with excess update 700 is shown. When a new AP MAC address has been detected, the positioning software 112 of the mobile device 100 checks whether the new AP MAC address is located in a vicinity of a full rank GVS Tag (i.e. a fully populated GVS Tag, with APs assigned to each of its nodes). In this scenario, the positioning software 112 expands this full rank GVS Tag and associates the new AP MAC address(es) with the GVS Tag once an acceptable criteria has been met. In the example of FIG. 7, the excess update slots of the GVS Tag payload structure do not have a position index therefore, the new AP MAC address may be associated with a centre of GVS Tag. Alternatively, the new AP MAC address may be associated with one of the nodes of the GVS Tag. The acceptable criteria may be a function of resolution, RSS, relative geometry or number of measurements, for example. The acceptable criteria are determined by the positioning software 112 of the mobile device 100.

Figure 8:
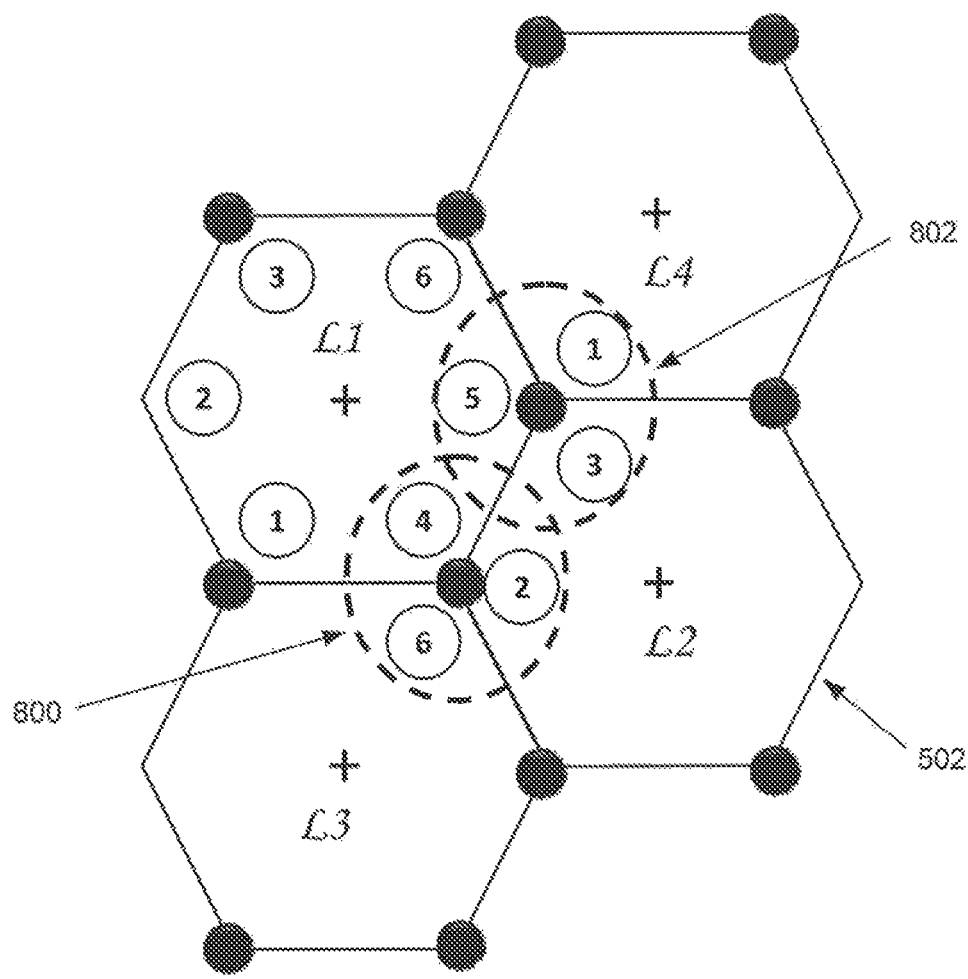
FIG. 8 shows the relative geometrical sequence between a trio of neighboring GVS Tags.
Figure 9:
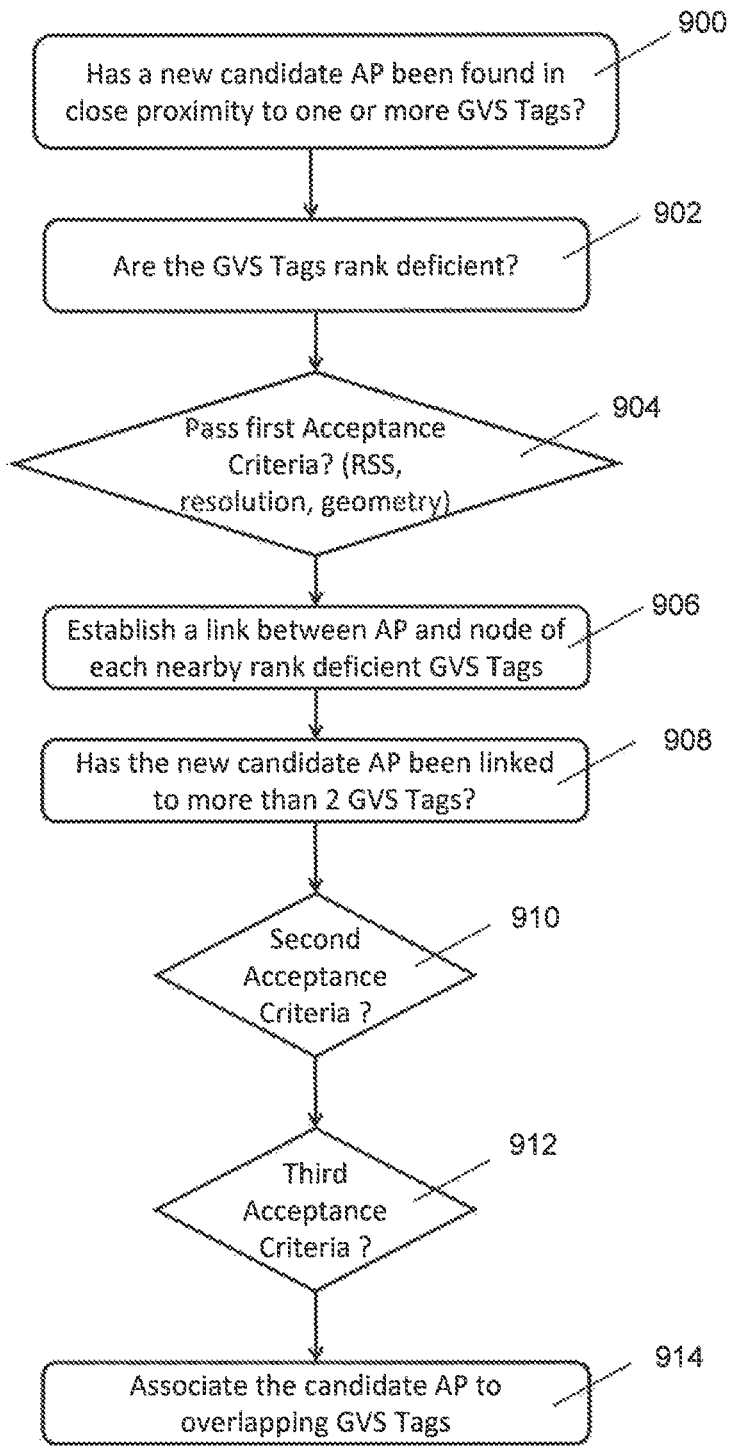
FIG. 9 is a flowchart depicting an auto-update method.

FIG. 8 shows the relationship between adjacent tags having common nodes, which may be relied upon to update GVS Tag information. An example method for performing the update is shown in FIGS. 9. At 900 and 902, when the positioning software 112 finds a new AP located in the vicinity of a rank deficient GVS Tag (i.e. a GVS Tag without a full number/set of APs), the positioning software 112 goes through different acceptance criteria steps. When the new AP passes the first acceptance criteria (e.g. RSS, geometry, resolution . . . ), at 904, the positioning software 112 establishes a logical link between: the deficient rank GVS Tag and its potential filling place(s) (i.e. which node in the AP geometry {1,2,3,4,5, and 6 } within the given GVS Tag), and the candidate AP found in its vicinity, at 906.

At 908, when more than two links have been established for a given AP candidate, a second acceptance criteria is triggered, at 910, which is based on relative geometry. As shown in FIG. 8, a trio of neighbouring GVS Tags (e.g. $\{L_1L_2L_3\}$ and $\{L_1L_2L_4\}$ share a relative geometrical sequence on the node that is common to all three GVS Tags (i.e. {2,4,6 }{1,3,5,} which is identified by reference numeral 800 and {1,3,5, } which is identified by reference numeral 802, respectively {2,4,6 }. Therefore, a valid geometrical sequence should be verified between the three neighbouring GVS Tags and the potential node with which the given AP candidate should be associated. A third acceptance criteria may be selected, at 912, to examine the proximity of the candidate AP with respect to a trio of neighbouring GVS Tags. Once all acceptance criteria have been verified, the Positioning software 112 associates the candidate AP to the three neighbouring GVS Tags, at 914.

Overlay Updates are used to efficiently deliver updated GVS Region information without retransmitting a full GVS Region if the full GVS Region was previously received by the positioning software 112 of the mobile device 100. This enables the Positioning software 112 to refresh a subset of the GVS Tags (i.e. use newly detected or updated AP information). The Positioning software 112 can periodically request an Overlay Update from the GVS Factory by providing the current GVS Region ID and GVS Region Time Stamp. The GVS Factory can maintain GVS Region Overlays for a given time period after which it may force the Positioning software 112 to receive a new GVS Region (if for example, there have been many updates since the time stamp of the last received GVS Region and/or if the GVS Factory has set a new resolution for the GVS Region). Once the positioning software 112 receives a GVS Region Overlay, the same process as described in the position index population may be followed to effectively update the positioning software's 112 current GVS Region. The GVS Region time stamp field is also updated to the most current value.

When the mobile device 100 approaches GVS Region boundaries (i.e. when the Boundary Codes of the GVS Tag that the mobile device 100 is currently closest to starts with "1", as shown at Table 2) and when the positioning software 112 does not have a GVS Region adjacent to the GVS Region of the current GVS Tag the positioning software 112 can request a dynamic update from the GVS Factory.

In one embodiment, the positioning software 112 may calculate the rate of change between specific Boundary Codes found within the accessed GVS Tags. Based on the rate of increase of GVS Region Tier numbers, indicating that the mobile device 100 is approaching a GVS Region boundary, the positioning software 112 can elect to request a dynamic update In another embodiment, the positioning software 112 may store and send hop count numbers of the recently accessed GVS Tags to the GVS Factory; the GVS Factory then utilizes this information with other information such as the GVS Region reference position index and resolution to determine the optimal GVS Region shape and pattern required in the dynamic update.

In another embodiment, the mobile device 100 utilizes its resources (e.g. memory size, data network speed, and data network accessibility) and client status (e.g. velocity and navigation route) before requesting a dynamic update.

In still another embodiment, information received from the onboard global satellite navigation system (GNSS) may trigger an update. For example, when GNSS signal reception conditions are poor, a new GVS Region may be retrieved based on the current predicted route.

In yet another embodiment, a positioning software 112 can trigger an overlay update if the locally found adjacent GVS Region has a different resolution than the currently accessed GVS Region.

GVS-based positioning will now be described with reference to FIG. 10. The positioning software 112 uses the GVS Tags in the GVS Region as received from the GVS Factory. The positioning software 112 may follow a number of methods to optimally determine a GVS-based position.

Following decoding and populating of the GVS Region with GVS Tags on the mobile device 100, the positioning software 112 may be used to determine a location of the mobile device 100. To initiate a position calculation, the positioning software 112 will first detect Radio Frequency transmitters and obtain a list of MAC addresses for the Wi-Fi APs that the mobile device 100 can detect, along with the serving C-SID if the mobile device's cellular transceiver is active. The positioning software 112 will then start to compare these against the GVS Tags.

Normally, the MAC addresses of a number of the detected nearby WiFi APs will match the MAC and/or compressed MAC addresses found within the GVS Tags. If the C-SID is also available, this will further accelerate the search across GVS Tags and allow MAC compression (i.e. data compression). When a C-SID match is found but none of the detected WiFi AP's MAC addresses are matched to a GVS Tag in the GVS Region, the GVS Positioning Engine will return a weighted average of the all the GVS Tag position indexes that match the detected C-SID. The GVS positioning engine may operate differently according to the number of matched WiFi AP's MAC addresses, as depicted in FIG. 10.

Figure 10:
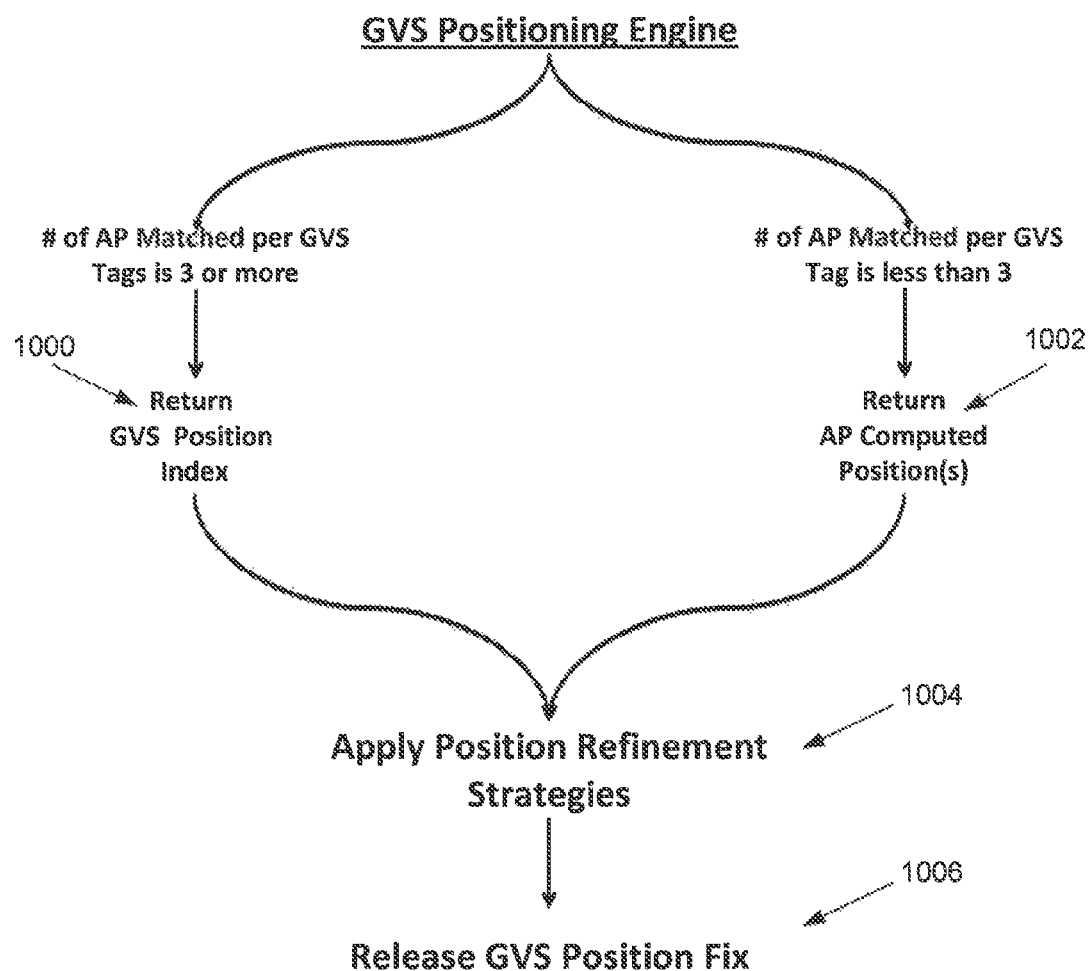
FIG. 10 is a flowchart depicting a method of determining a position.

As shown in FIG. 10, in an example, the GVS Positioning Engine may return the GVS Tag position index directly, as indicated at 1000, when the number of matched APs per GVS Tag is 3 or more. Alternatively, the GVS Positioning Engine may return a weighted average of the computed position of the matched APs, as indicated at 1002, when the number of matched APs per GVS Tag is less than 3, for example. The number of matched APs per GVS Tag that determines whether the GVS Positioning Engine returns the GVS Tag position index directly or returns a weighted average of the computed position of the matched APs is not limited to 3 and may be set by the user.

The computed position of a given AP per GVS Tag can be calculated using the following information: the GVS Tag position index, the number of matching nodes, the GVS Region resolution, and the geometry of the matched APs within the GVS Tag (i.e. matched AP node {1,2,3, 4,5,or 6 }, within the GVS Tag).

Figure 11:
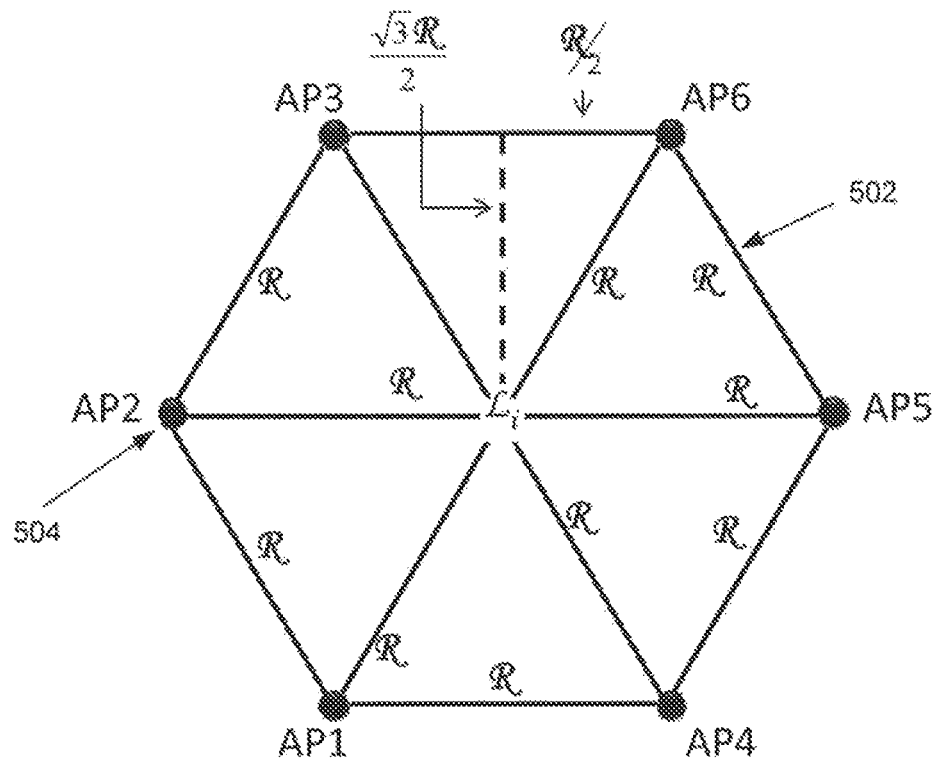
FIG. 11 shows a computed node position based on a GVS position tag index.

Referring to FIG. 11, the GVS Region uses an underlying grid based on regular hexagon shapes, and the GVS Tag position index is given by:

$$\mathcal{L}_1 \triangleq \begin{bmatrix} x \\ y \end{bmatrix},$$

and R indicates the GVS Region resolution, Hence, the computed position of the six APs, {AP1, AP2, AP2, AP3, A, APS, and AP6}, can be found by:

$$AP1 = \mathcal{L}_1 + R \cdot \begin{bmatrix} -1/2 \\ -\sqrt{3/2} \end{bmatrix}, AP2 = \mathcal{L}_1 + R \cdot \begin{bmatrix} -1 \\ 0 \end{bmatrix},$$

$$AP3 = \mathcal{L}_1 + R \cdot \begin{bmatrix} -1/2 \\ \sqrt{3/2} \end{bmatrix}, AP4 = \mathcal{L}_1 + R \cdot \begin{bmatrix} 1/2 \\ -\sqrt{3/2} \end{bmatrix},$$

$$AP5 = \mathcal{L}_1 + R \cdot \begin{bmatrix} 1 \\ 0 \end{bmatrix}, AP6 = \mathcal{L}_1 + R \cdot \begin{bmatrix} 1/2 \\ \sqrt{3/2} \end{bmatrix}.$$

In addition to the algebraic equations, the curvature of the earth is compensated for using standard equations when determining node position.

Additional methods may then be used to further refine the performance of the Positioning Engine, as indicated at 1004 of FIG. 10, prior to releasing the GVS position fix, at 1006. In one embodiment, when a GVS Positioning Engine found several GVS Tags matched by more than three APs, a position refinement method may be selected to return the weighted average of all of these GVS Tag position indexes directly, without calculating the node position. The weighting function can be function of: the relative RSS of the matched APs, the relative GVS Region Resolution and/or the geometry of the GVS Tag.

In another embodiment, a position refinement method may be selected to return one of the GVS Tag position indexes with favourable AP matching attributes, such as RSS and its variance over several observations.

In still another embodiment, when the GVS Positioning Engine determined that several GVS Tags have been matched by less than three APs each, a positioning refinement method may be used to select the weighted average all of APs computed positions.

In yet another embodiment, when the GVS Positioning Engine determined that some GVS Tags have been matched by less than three APs each, while other GVS Tags have been matched by more than three APs, a positioning refinement method may be used to select the weighted average of all returned positions (i.e. GVS Tag position indexes and APs computed positions).

In another embodiment, a position refinement method may include ignoring and discarding some APs when the APs: were experiencing low RSS, displayed bad geometry (e.g. the AP moved after a GVS Region was received) or had been considered within another GVS Tag.

In another embodiment, when the GVS Positioning Engine determined that some GVS Tags at different layers have been matched by less than three APs each, while other GVS Tags have been matched by more than three APs, a positioning refinement method may be used to utilize the layer number information (Layer #) within all or some of the GVS Tags to provide a 3D position.

In another embodiment, the GVS Positioning Engine may use a positioning refinement method as described herein to calculate a position uncertainty and/or a position confidence level. In another embodiment, the previous time tagged position fix can be used to verify any position ambiguity as a result of duplicated APs MAC addresses across GVS Tags.

It will be appreciated by a person skilled in the art that the GVS Positioning Engine may use more than one position refinement method concurrently.

Further it will be appreciated that the methods described herein may be provided as computer-readable code executable by at least one processor of the mobile device to perform the method and may be stored in a computer-readable medium, such as a non-transitory computer-readable medium. Some of the steps of the methods described herein may alternatively be carried out by hardware or a combination of hardware and software.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A method of determining a location of a mobile device, comprising:
    detecting, at the mobile device, at least one Radio Frequency transmitter;
    comparing an identifier associated with the at least one detected Radio Frequency transmitter with identifiers of a number of Radio Frequency transmitters located within a geographical area, global locations associated with the identifiers having been decoded from information received at the mobile device prior to detection of the at least one Radio Frequency transmitter at the mobile device, the information comprising a global location of a single node of a geographically bounded tag of a region that covers the geographical area and an indexing procedure for determining global locations of other nodes of other geographically bounded tags of the region, the geographically bounded tags represented by a set of geometrically similar polygonal shapes of a grid structure, ones of the identifiers of the number of Radio Frequency transmitters associated with ones of the nodes; and
    determining the location of the mobile device by identifying a matching node between the identifier associated with the at least one detected Radio Frequency transmitter and one of the identifiers of the number of Radio Frequency transmitters associated with one of the nodes of the geographically bounded tags;
    wherein the identifiers of the number of Radio Frequency transmitters are reduced versions of corresponding Radio Frequency transmitter addresses and the location of the mobile device is determined based on a weighted average when the identifier associated with the at least one detected Radio Frequency transmitter is associated with more than one node.

2. A method as claimed in claim 1, wherein the weighted average is a function of one or both of: received signal strength (RSS), the resolution of the region and the geometry of the geographically bounded tags.

3. A method as claimed in claim 1, wherein ones of the number of Radio Frequency transmitters are access points of WiFi networks, the reduced versions of the ones of the number of Radio Frequency transmitters comprising: reduced prefix portions of corresponding MAC addresses of the ones of the number of Radio Frequency transmitters and reduced device specific portions of the corresponding MAC addresses.

4. A method as claimed in claim 1, comprising requesting further information associated with Radio Frequency transmitters located within an adjacent geographical area when the mobile device is located near a boundary of the geographical area.

5. A method as claimed in claim 1, wherein the information is received from one or both of: a server and a memory of the mobile device.

6. A method as claimed in claim 1, wherein an information update is received when the information is no longer current.

7. A method as claimed in claim 1, wherein the information is updated with information relating to the at least one Radio Frequency transmitter detected at the mobile device.

8. A method as claimed in claim 7, wherein the information comprises information fields and the information update populates one of: all information fields and some information fields.

9. A method as claimed in claim 1, wherein at least one of the number of Radio Frequency transmitters is a base station in a cellular wireless network.

10. A method as claimed in claim 1, wherein the number of Radio Frequency transmitters comprise more than one type of Radio Frequency transmitter technology.

11. A method as claimed in claim 1, comprising sending the information to another mobile device.

12. A method as claimed in claim 1, wherein the ones of the identifiers are associated with the ones of the nodes based on at least one of: proximity to the global locations of the nodes, recorded received signal strength at the global locations of the nodes, number of recorded observations at the global locations of the nodes, location uncertainty of the selected ones of the Radio Frequency transmitters and recorded signal propagation time at the global locations of the nodes.

13. A mobile device comprising:
    a wireless communication system for detecting at least one Radio Frequency transmitter;
    a processor in communication with the wireless communication system to:
        receive information associated with a number of Radio Frequency transmitters located within a geographical area, and decode the information prior to detection of the at least one Radio Frequency transmitter, the information comprising a global location of a single node of a geographically bounded tag of a region that covers the geographical area and an indexing procedure for determining global locations of other nodes of other geographically bounded tags of the region, the geographically bounded tags represented by a set of geometrically similar polygonal shapes of a grid structure, ones of the identifiers of the number of Radio Frequency transmitters associated with ones of the nodes; and
        following detection of the at least one Radio Frequency transmitter, compare an identifier associated with the at least one Radio Frequency transmitter with identifiers of the number of Radio Frequency transmitters to identify a matching node between the identifier associated with the at least one detected Radio Frequency transmitter and one of the identifiers of the number of Radio Frequency transmitters associated with one of the nodes of the geographically bounded tags;
    wherein the identifiers of the number of Radio Frequency transmitters are reduced versions of corresponding Radio Frequency transmitter addresses and the location of the mobile device is determined based on a weighted average when the identifier associated with the at least one detected Radio Frequency transmitter is associated with more than one node.

14. A mobile device as claimed in claim 13, wherein at least one of the number of Radio Frequency transmitters is an access point of a WiFi network.

15. A mobile device as claimed in claim 13, wherein at least one of the number of Radio Frequency transmitters is a base station in a cellular wireless network.

16. A mobile device as claimed in claim 13, wherein the weighted average is a function of one or both of: relative received signal strength (RSS) and the geometry of the geographically bounded tags.

17. A method of generating and storing an encoded structure associated with a geographical area for use in determining a location of a mobile device, the method comprising:

selecting a polygonal shape for cells of a grid structure, the cells comprising nodes, adjacent ones of the cells sharing common nodes;

selecting a number of the cells;

searching a reference database comprising identifiers of Radio Frequency transmitters of the geographical area and global locations of the Radio Frequency transmitters and linking identifiers of selected ones of the Radio Frequency transmitters to ones of the nodes based on at least one of: proximity to the global locations of the nodes, recorded received signal strength at the global locations of the nodes, number of recorded observations at the global locations of the nodes, location uncertainty of the selected ones of the Radio Frequency transmitters and recorded signal propagation time at the global locations of the nodes;

storing the identifiers of the selected ones of the Radio Frequency transmitters in association with the ones of the nodes of the encoded structure and storing a global location in association with a first node of a first cell, global locations of other ones of the nodes of the grid structure determinable based on an indexing procedure of the encoded structure;

wherein the identifiers are reduced versions of the Radio Frequency transmitter addresses of the selected ones of the Radio Frequency transmitters.

18. A method as claimed in claim 17, wherein the reference database is a local database that is generated at the mobile device by storing geo-tagged recordings of detected nearby Radio Frequency transmitters.

19. A method as claimed in claim 17, wherein the number of Radio Frequency transmitters comprises one or more of: an access point of a WiFi network, a base station of a cellular wireless network and other radio or network equipment.

* * * * *